June 25, 1940.  S. M. ANDERSON  2,205,782
AIR DISTRIBUTOR
Original Filed Aug. 30, 1935  2 Sheets-Sheet 1
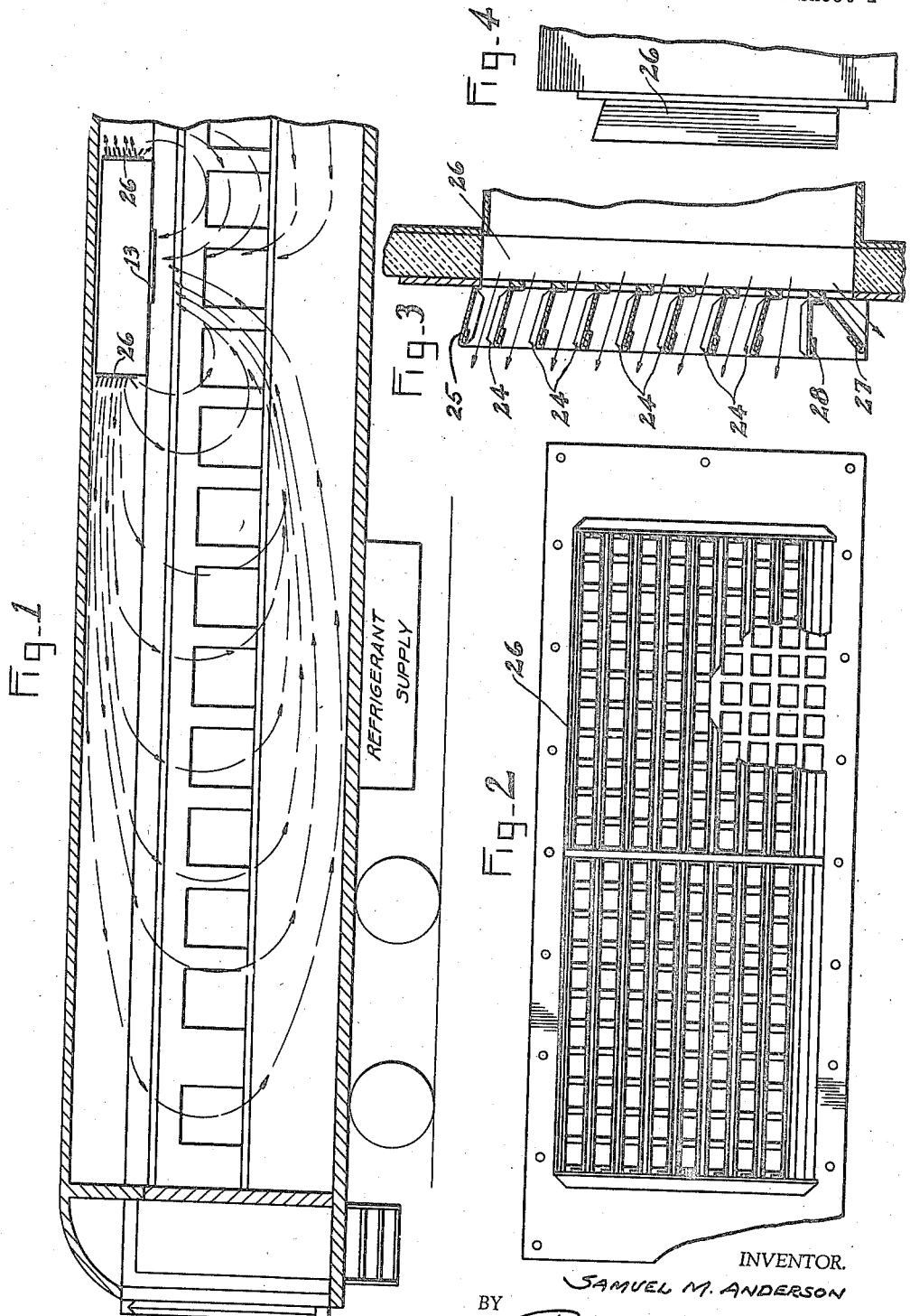
INVENTOR.
SAMUEL M. ANDERSON
BY Robert T. Palmer
ATTORNEY.

June 25, 1940.
S. M. ANDERSON
2,205,782
AIR DISTRIBUTOR
Original Filed Aug. 30, 1935    2 Sheets—Sheet 2
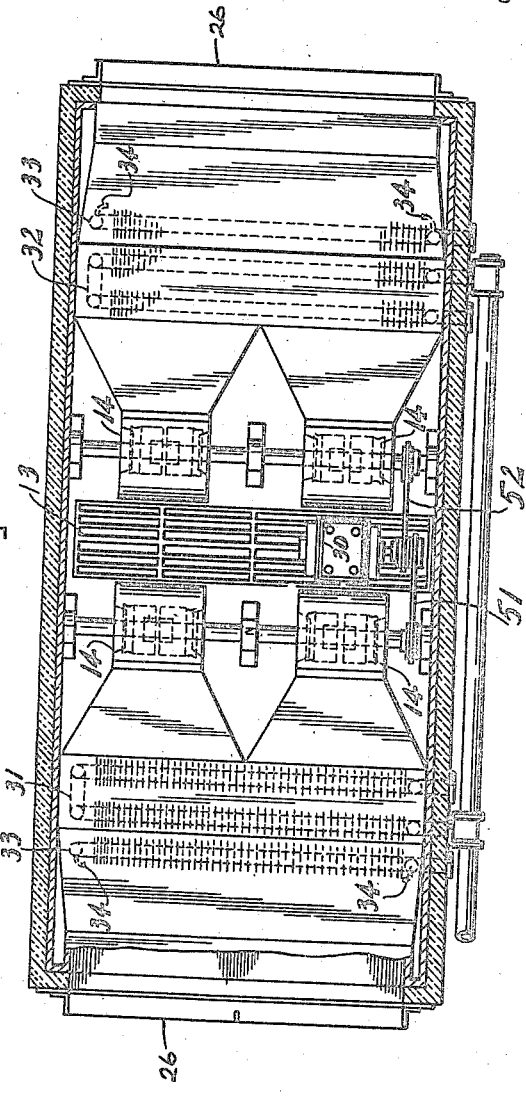
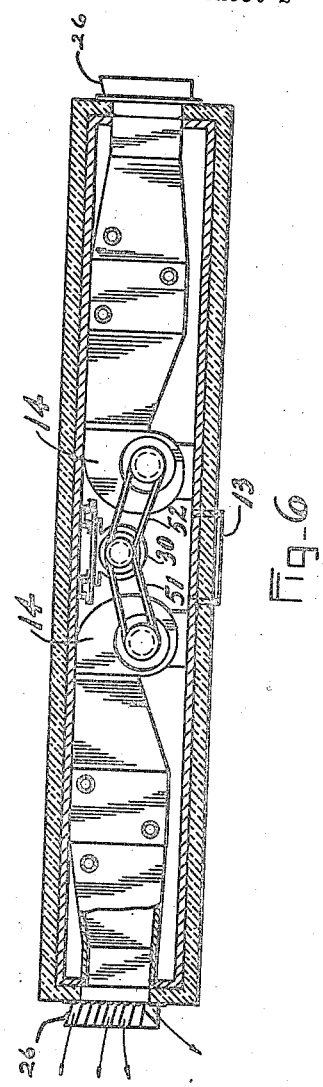
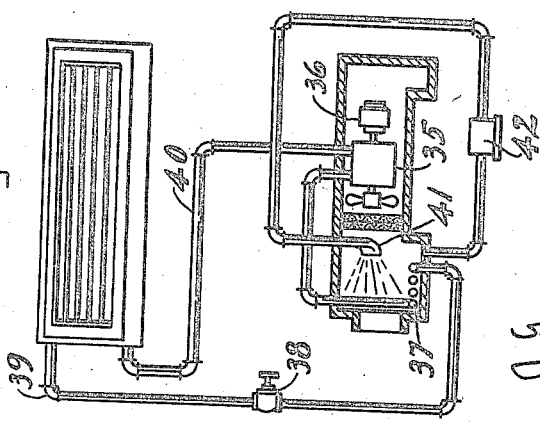
INVENTOR
SAMUEL M. ANDERSON
Robert J. Palmer
ATTORNEY Patented June 25, 1940

2,205,782

UNITED STATES PATENT OFFICE 2,205,782

AIR DISTRIBUTOR

Samuel M. Anderson, Sharon, Mass., assignor to B. F. Sturtevant Company, Boston, Mass.

Original application August 30, 1935, Serial No. 38,547, now Patent No. 2,149,382, dated March 7, 1939. Divided and this application November 17, 1938, Serial No. 240,993

1 Claim. (Cl. 98—13)

This invention relates to the conditioning of air and relates more particularly to methods and apparatus for the ductless distribution of conditioned air in railway passenger cars.

This application is a division of my copending application Serial No. 38,547, filed August 30, 1935, now Patent No. 2,149,382, dated March 7, 1939.

It is usual in most railway passenger cars to mount the air conditioning unit for each car in one end and in the roof zone of the car and to supply the conditioned air into the passenger space through one or more longitudinal distributing ducts with spaced discharge outlets. In some cases, the railroads prefer to have the air conditioning units mounted in the longitudinal centers of the roof zones of the car. With such an arrangement, distribution by ducts is not feasible. Attempts have been made to blow the conditioned air by bulkhead discharge into the passenger space but in most cases in summer, where the air discharged was cold, due to differences in pressure in the upper and lower levels and to the density of the cold air, the areas nearest the conditioning unit were supplied with too much and too cold air while the areas in the two ends of the car received too little benefit from the unit.

According to this invention, the conditioned air discharged from a center car unit is divided at the discharge outlets into a plurality of layers or streams of air, one above the other, the uppermost layer being deflected upwardly with such velocity of discharge, that it reaches one end of the car before it settles, under the influence of gravity and pressure differences, into the passenger space. The other layers of air are so projected that the lowermost layers settle into passenger areas nearer the conditioning unit and the uppermost layers settle into passenger areas further removed from the unit, each layer of air cooperating with the other layers so that equal distribution throughout the car length is provided.

In one embodiment of the invention, all of the upper layers of conditioned air are deflected upwardly with substantially the same degree of deflection, but the lowermost layer or layers are projected so sharply downwardly that they are drawn into the recirculated air inlet opening in the lower center of the conditioning unit without having entered directly into the passenger space. These downwardly directed currents of air serve to deflect by induction the upper layers of air into the passenger space. Those upper layers of air nearer the downwardly deflected layer or layers are influenced more thereby and settle into passenger areas nearer the conditioning unit. Those layers of air further removed from the downwardly deflected layer or layers are influenced less thereby and settle into passenger areas further removed from the conditioning unit.

An object of the invention is to provide proper distribution of conditioned air into a passenger vehicle, without the use of ducts.

Another object of the invention is to project conditioned air into a passenger vehicle, from a conditioning unit mounted above the passenger space, in a plurality of superimposed layers.

Other objects of the invention will be apparent from the following explanation taken together with the drawings.

The invention will now be described with reference to the drawings of which:

Fig. 1 is a side elevation in section of one embodiment of this invention;

Fig. 2 is an end view of the discharge outlets of the air conditioning unit of Fig. 1;

Fig. 3 is an enlarged side sectional view of the discharge outlets of Figs. 1 and 2;

Fig. 4 is a side elevation of the end portions of the air conditioning unit of Fig. 1, adjacent each discharge outlet;

Fig. 5 is a plan view with cover removed of the air conditioning unit of Figs. 1, 2, 3 and 4;

Fig. 6 is a side elevation with the near side removed of the air conditioning unit of Fig. 5; and Fig. 7 is a diagrammatic view showing how refrigeration may be supplied to the air conditioning units according to this invention.

As shown by Fig. 3, a plurality of deflector plates 24, which are parallel to each other and the upper wall 25 of the discharge outlet, indicated generally by 26, are provided, with the result that air flowing between the upper plates 24 and the wall 25 and between the successive plates 24 has substantially the same discharge velocity and is deflected upwardly the same slight degree.

The lowermost deflector plate 27 is given a substantial angle of deflection downwardly as illustrated by Figs. 1 and 3. The deflector plate 28 adjacent and above the deflector plate 27 is substantially horizontal.

The air deflected from the discharge outlet 26 under the lowermost deflector plate 27 is returned at high velocity in almost a short circuit path to the centrally located recirculated air inlet opening 13, without passing through the passenger space, as indicated by the arrows of Fig. 1.

The air passing between the lowermost deflector plate 24 and its adjacent plate 28 is decreased in velocity by the diverging sides of each plate with respect to the air flow.

The air deflected underneath the lowermost deflector plate 27 provides a substantial induction effect upon the flow of streams of air projected between the various pairs of deflector plates by deflecting them downwardly and causing them to be returned more quickly to the recirculated air inlet. This induction force has, of course, a greater effect upon the streams of air passing between the plate 28 and lowermost plate 24 due not only to the reduced velocity of air flowing between these plates, but also to their immediate proximity to the induction air with the result that the air projected between these plates passes but a short distance into the car and is quickly returned to the recirculated air inlet as illustrated by Fig. 1.

The streams of air passing between the pairs of plates 24 and between the uppermost plate 24 and the wall 25 is effected by the induction action of the air flowing along the deflector plate 27 on its way to the recirculated air inlet opening 25. This effect varies, of course, as the distance between the deflector plate 27 and the superimposed streams of projected air increases. That is to say, the induction stream of air has least effect upon the stream of air projected between the uppermost plate 24 and the wall 25 with the result that this stream of air is projected all the way to the end of the car as shown by the uppermost line of arrows indicating the air flow of Fig. 1. The effect on the air projected between the adjacent pairs of plates 24 increases as the distance of the spaces between these pairs of plates from the lowermost plate 27 decreases, with the result that the air projected between the various pairs of plates 24 is subjected to greater and greater influence from the induction air the nearer the superimposed streams are to the induction current and the streams are projected different distances into the car, as shown by the arrows of Fig. 1.

The heat exchange unit shown by Figs. 5 and 6 may be employed with the embodiment of the invention illustrated by Figs. 1 to 4 inclusive. The heat exchange unit comprises the four blowers 14, the two left hand ones of which project air towards one end of the car, and the two right hand ones of which project air towards the opposite end of the car, they all drawing recirculated air through the recirculated air inlet opening 13. The fans may all be driven by a single electric motor 30, by the belts 51 and 52 as illustrated. Two sets of evaporator coils 31 and 32 are provided at opposite ends of the unit for cooling and dehumidifying the air passed over them by the fans. Two sets of steam heating coils 33 are also arranged at opposite ends of the unit for heating the air in winter. With the coils 33 are associated the steam humidifiers 34 for humidifying the heated air.

The refrigerant may be supplied by the arrangement illustrated diagrammatically by Fig. 7, where the refrigerant compressor 35, driven by the electric motor 36, compresses the refrigerant which passes through the condenser coils 37, expansion valve 38, through the pipe 39 and through the evaporator coils 31 to be returned through the pipe 40 to the compressor.

The condenser coils 37 may be air cooled or water cooled as by the spray nozzle 41 supplied with water by the pump 42 from a convenient water storage tank.

While one embodiment of the invention has been disclosed for the purpose of illustration, it should be understood that the invention is not limited to the exact details described, as many departures may be made by those skilled in the art, after having had access to this disclosure.

What is claimed is:

Air distributing means for a passenger vehicle for use with an air conditioning unit extending substantially completely crosswise the interior of said vehicle from one longitudinal side to the other longitudinal side thereof and above the passenger space, comprising means forming a discharge outlet opening extending substantially completely crosswise said vehicle in one end of said unit, a plurality of deflectors in said outlet and extending completely crosswise same for deflecting the air from said unit upwardly, a lower substantially horizontal deflector, and a lowermost deflector extending substantially completely crosswise said outlet and inclined sharply downwardly, the space between said horizontal deflector and said lowermost deflector being closed so that no air can be projected therethrough.

SAMUEL M. ANDERSON.